United States Patent
Harata et al.

(10) Patent No.: US 6,927,931 B2
(45) Date of Patent: Aug. 9, 2005

(54) MAGNETIC DISK DRIVE AND METHOD OF CONTROLLING THE SAME

(75) Inventors: Hiroshi Harata, Kanagawa (JP); Atsuo Suga, Kanagawa (JP); Yuji Suzuki, Kanagawa (JP); Nobuhiro Kuwamura, Kanagawa (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 149 days.

(21) Appl. No.: 10/650,934

(22) Filed: Aug. 27, 2003

(65) Prior Publication Data

US 2004/0223250 A1 Nov. 11, 2004

(30) Foreign Application Priority Data

Sep. 4, 2002 (JP) .......................... 2002-258390

(51) Int. Cl.⁷ ................................. G11B 5/02
(52) U.S. Cl. .............................. 360/55; 360/61; 360/69; 360/78.04; 360/97.02
(58) Field of Search ...................... 360/55, 61, 68–69, 360/78.04, 78.07, 97.02

(56) References Cited

U.S. PATENT DOCUMENTS

6,078,455 A * 6/2000 Enarson et al. ............... 360/68

FOREIGN PATENT DOCUMENTS

| JP | 61-156578 | * | 7/1986 |
| JP | 09-245419 | | 9/1997 |
| JP | 11-016327 A | | 1/1999 |
| JP | 2003-141703 | * | 5/2003 |
| JP | 2004-118993 | * | 4/2004 |

* cited by examiner

*Primary Examiner*—David Hudspeth
*Assistant Examiner*—Natalia Figueroa
(74) *Attorney, Agent, or Firm*—Townsend and Townsend and Crew LLP

(57) ABSTRACT

A magnetic head is disposed opposite to a magnetic disk having a first recording area capable of facilitating writing information to the magnetic disk when the surrounding temperature is low, and a second recording area capable of surely holding information written to the magnetic disk when the surrounding temperature is high. Information is written to the first recording area when the surrounding temperature is low and is transferred later to the second recording area.

15 Claims, 6 Drawing Sheets

Corresondence information table 4

| Correspondence information ||
|---|---|
| Low-temperature storage address | Ordinary-temperature storage address |
| Address A00 | Address B00 |
| Address A01 | Address B01 |
| Address A02 | Address B02 |
| Address A03 | Address B03 |
| Address A04 | Address B04 |
| · | · |
| · | · |

41     42

MAGNETIC DISK DRIVE AND METHOD OF CONTROLLING THE SAME

BACKGROUND OF THE INVENTION

1. Field of the Invention

The present invention generally relates to a magnetic disk drive, and more particularly, to a magnetic disk included in the magnetic disk drive and a method of using such magnetic disk.

2. Description of Related Art

In the art disclosed in Japanese published application JP-A 11-16327, magnetic disk drive is prevented from getting affected by the temperature of the surroundings by providing a heat-insulating material. This prevents condensation in the magnetic disk drive. However, this prior art does not give any consideration to the effect caused by the temperature of the surroundings itself. And therefore it could not provide high reliability on magnetic recording and retrieving of data.

In the art disclosed in Japanese published application JP-A 9-245419, it merely cools down the temperature of a magnetic disk drive in case the temperature rises beyond a pre-fixed value, and does not give any consideration to operating the magnetic disk drive at low temperatures.

Magnetic disk drives, i.e., hard disk drives (HDDs), was used as external storage devices for general computers at the very beginning. Magnetic disk drives have been gradually applied to personal computers and laptops. Recently, magnetic disk drives have been widely applied to various usages including audio systems, video systems, car navigation systems, copying machines and such, and the severity of operating conditions has been enhanced accordingly.

For example, although the temperature of an environment in which personal computers are used is in the range of about 5 to 55° C., HDDs to be used for other purposes such as the ones provided for vehicles, must be guaranteed to function properly for a wide range of temperatures, such as −20 to 70° C.

The coercive force of a magnetic disk increases at low temperatures and hence the recording ability of the magnetic disk becomes insufficient if information is recorded by a conventional recording method. Such increase of the coercive force cannot be coped with, simply by increasing current supplied to the coil of the recording head. However, if the coercive force of a magnetic disk is reduced to use the magnetic disk in a low-temperature environment, demagnetization increases due to thermal demagnetization at high temperature, and it is possible that data recorded on the magnetic disk vanishes when the temperature of the surroundings rises. Thus, it is difficult to cope with both maintaining recording ability at low temperatures and maintaining record holding ability at high temperatures.

Accordingly, what is needed is a magnetic disk drives that is capable of reliable recording and retrieving abilities under a wide range of surrounding temperature.

SUMMARY

In a preferred embodiment, the invention provides a magnetic disk drive capable of operating under a wide range of surrounding temperatures.

In accordance with one aspect of the present invention, a magnetic disk drive comprises a magnetic disk, a magnetic head facing the magnetic disk, wherein the magnetic disk has a first recording area capable of facilitating writing or recording information onto the magnetic disk when the surrounding temperature is low, and a second recording area capable of maintaining information written to the magnetic disk when the surrounding temperature is high. In this magnetic disk drive, information is written or recording onto the first recording area when the surrounding temperature is low, and the information written to the first recording area is written to the second recording area when necessary.

Upon recording of the information, the surrounding temperature is measured and if the temperature is lower than the predetermined temperature, the information is recorded in the first recording area. Then the surrounding temperature is measured at proper intervals during standby time. The information written to the first recording area is moved to the second recording area when the surrounding temperature rises beyond the predetermined temperature. The writing current supplied to the magnetic head may be increased in writing the information to the first recording area, in one embodiment.

As for alternative embodiments; 1) The coercive force of the first recording area is lower than that of the second recording area. 2) The first and the second recording area may be formed either on the same surface of one magnetic disk or on respective surfaces of separate magnetic disks. 3) The BPI (density of recording bits in a track) in a first recording area may be smaller than that of a second recording area.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 2 shows a correspondence information table 4 by way of example.

DESCRIPTION OF ILLUSTRATIVE EMBODIMENTS

Figure 1:
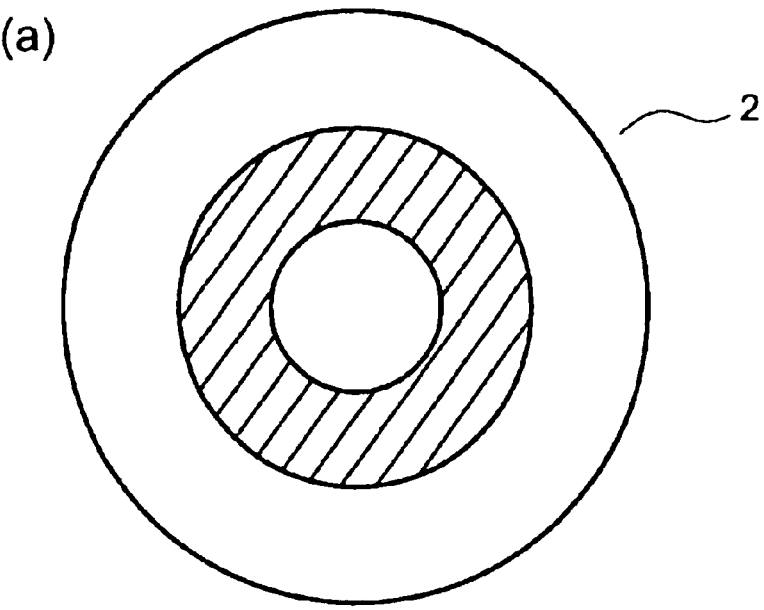
FIG. 1 is a plane view of a magnetic disk 2 employed in the present invention.
Figure 1:
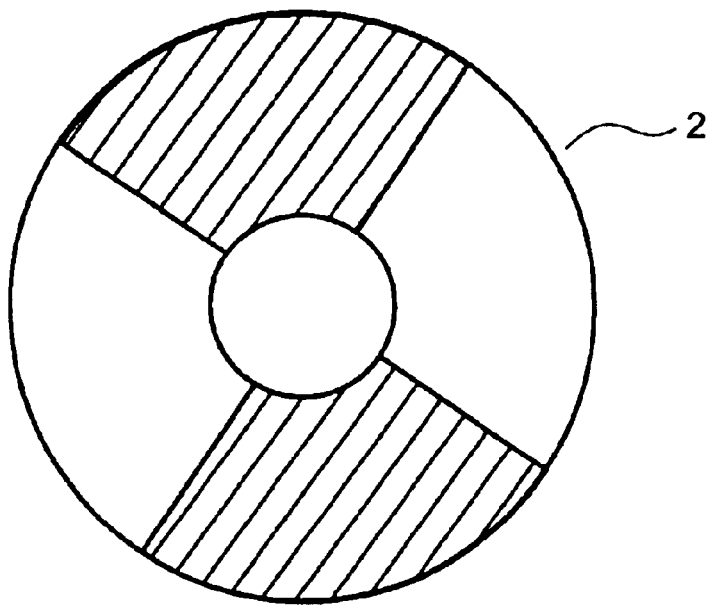

FIG. 1 is a plane view of a magnetic disk 2 employed in the present invention. As shown in FIG. 1(a), the magnetic disk has a surface provided with two concentric recording areas, namely, a first recording area for low-temperature recording and a second recording area for high-temperature or ordinary-temperature recording. Or alternatively, the surface of the magnetic disk may be divided into sectors for first recording areas and those for second recording areas as shown in FIG. 1(b). The first and the second recording area differ in characteristics or recording conditions.

Figure 3:
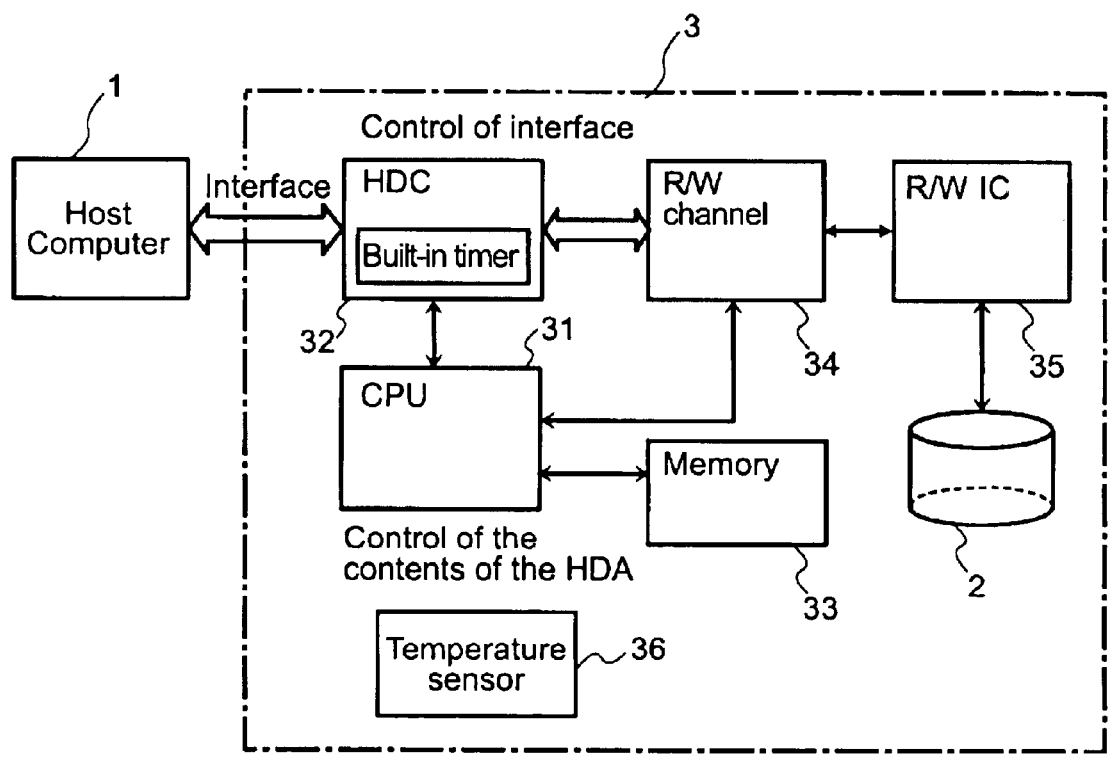
FIG. 3 is a block diagram of a magnetic disk drive in another embodiment according to the present invention.

FIG. 3 shows a block diagram of a computer system provided with the magnetic disk drive 3 according to the present invention, and it is provided with a memory 33. The memory 33 may be an external memory for a CPU or a cache memory. The computer system includes a host computer 1 constituting a part thereof, and the magnetic disk drive 3, i.e., an external storage device. In this exemplary embodiment, the magnetic disk drive 3 of the present invention is connected to a host computer 1, i.e., a general computer.

The magnetic disk drive 3 includes, as principal components, a microprocessor 31, a hard disk controller 32, the memory 33, a read/write channel 34, a read/write IC 35, a temperature sensor 36 and a magnetic disk 2, as well as mechanicals. The microprocessor 31 of the magnetic disk drive 3 takes control of the hard disk controller 32, the memory 33 and the read/write channel 34 for information exchange between the host computer 1 and the magnetic disk 2, and controls other parts of the magnetic disk drive 3. The hard disk controller 32 is interposed between the host computer 1 and the magnetic disk 2 to control operations for receiving and sending out data and commands. The memory 33 has a storage area for holding data to be accessed by the host computer 1, and a storage area for storing a correspondence information table 4 (FIG. 2), i.e., management information stored in the magnetic disk 2.

Figure 4:
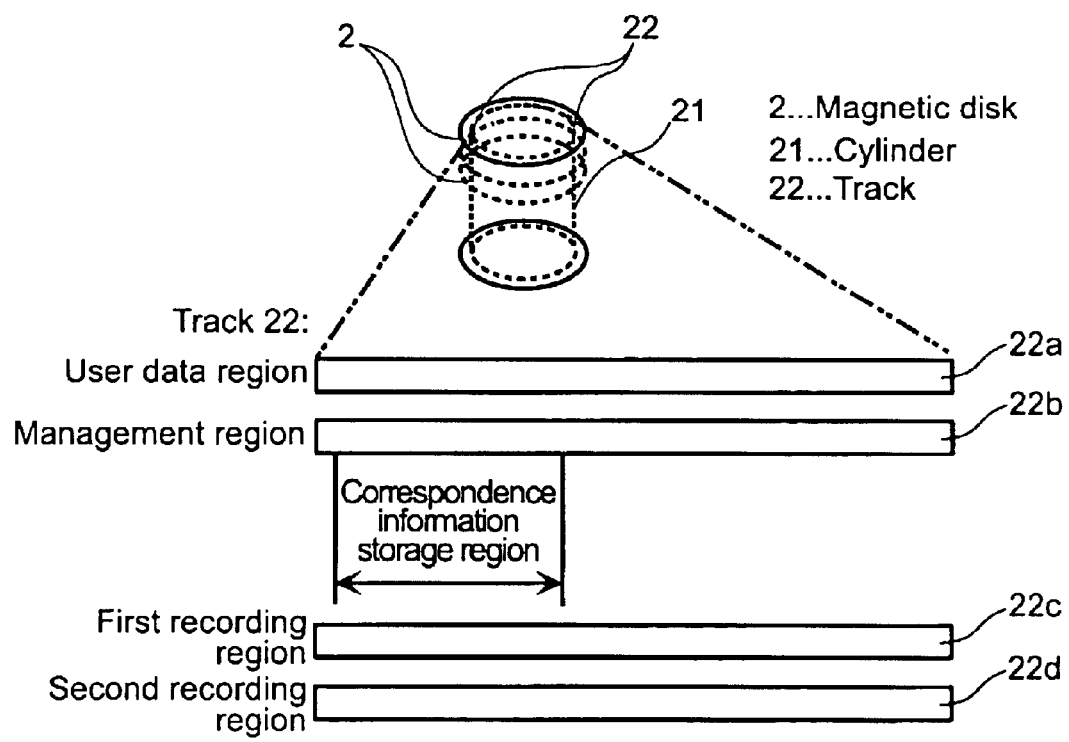
FIG. 4 is a diagram showing an outline of the magnetic disk 2 employed in the present invention.

FIG. 4 shows an exemplary construction of a magnetic disk 2, i.e., a storage medium. In particular, each of the tracks which corresponds to each circumference is shown as a strip. Magnetic disk 2 has a plurality of recording areas, namely, a first recording area capable of facilitating writing information when the surrounding temperature is low, and a second recording area capable of surely holding information when the surrounding temperature is high. The first recording area may be formed in one of the two surfaces of the magnetic disk 2 and the second recording area may be formed in the other surface of the magnetic disk 2. In the former case, one and the same cylinder 21 is able to identify the first recording area and the second recording area by surface numbers or area identifiers. In the latter case, concentric tracks 22 are formed in one recording surface, and the first and the second recording area are identified by track numbers. The first and the second recording area may be predetermined groups of sectors.

Each track 22 has a plurality of sectors, i.e., data recording units. A plurality of magnetic heads is disposed facing both the surfaces of each magnetic disk 2 at substantially the same radial positions, respectively. The magnetic heads move simultaneously in radial directions relative to the magnetic disk 2 for a seek operation for seeking desired tracks 22. Alternatively, only a single magnetic head may be used and the magnetic disk 2 may have a single recording surface.

The magnetic head writes or reads data to or from the sector of a desired track 22. The track 22 has a user data area 22a to which user data is written and from which user data is read, a management area 22b including a correspondence information storage area for storing information about the relation between the first and the second recording area, a first recording area 22c and a second recording area 22d.

The second recording area may be a magnetic medium for used under an ordinary condition such as room temperature, in which magnetic disk drives were ordinarily used, and the first recording area may be a medium having a characteristic that facilitates magnetic recording at low temperatures. The writing function of the magnetic disk drive may differently be controlled in dependence on the first recording area and the second recording area by changing the writing conditions. For example, data is written to the first recording area at a recording frequency lower than a normal recording frequency, or data is written to the first recording area by using a recording current higher than a normal recording current.

The magnetic disk drive 3 is able to read the information written to the second recording area even at low temperatures. A low-temperature environment makes information writing (recording) difficult and does not affect information reading (retrieving) significantly.

The host computer 1 specifies logical addresses in accessing the magnetic disk drive 3. The magnetic disk drive 3 converts the logical addresses into physical addresses including a cylinder number, a head number and a sector number.

FIG. 2 shows the correspondence information table 4 showing the contents of a correspondence information storage area. The information shown in the table 4 is stored in the management area 22b (FIG. 4) of the magnetic disk 2. Upon connection of the magnetic disk drive 3 to a power supply, the information stored in the management area 22b is read, the information is transferred to the memory 33 (FIG. 3) and is used for the management of relation. The information shown in the table 4 may be read immediately before reading user data from the magnetic disk 2 or immediately before writing data to the user data area 22a (FIG. 4). The information shown in the table 4 and other management data are stored and held in the management area 22b before the magnetic disk drive is disconnected from the power supply or a predetermined time after the connection of the magnetic disk drive 3 to the power supply, and are used immediately after the magnetic disk drive is connected again to the power supply and as the occasion demands.

The correspondence information table 4 has a low-temperature storage address section 41 storing addresses in the first recording area in which data is stored when the surrounding temperature is low, and a normal storage address section 42 storing addresses in the second recording area to which data stored when the surrounding temperature is low is transferred.

If the surrounding temperature is low when the magnetic disk drive 3 writes data provided by the host computer 1, the data is written to the first recording area and information is stored in the correspondence table to that effect. The magnetic disk drive 3 transfers the data specified by a low-temperature storage address later to a storage location specified by a corresponding normal storage address in the second recording area. Thus, the magnetic disk drive 3 moves and rewrites the data.

Figure 5:
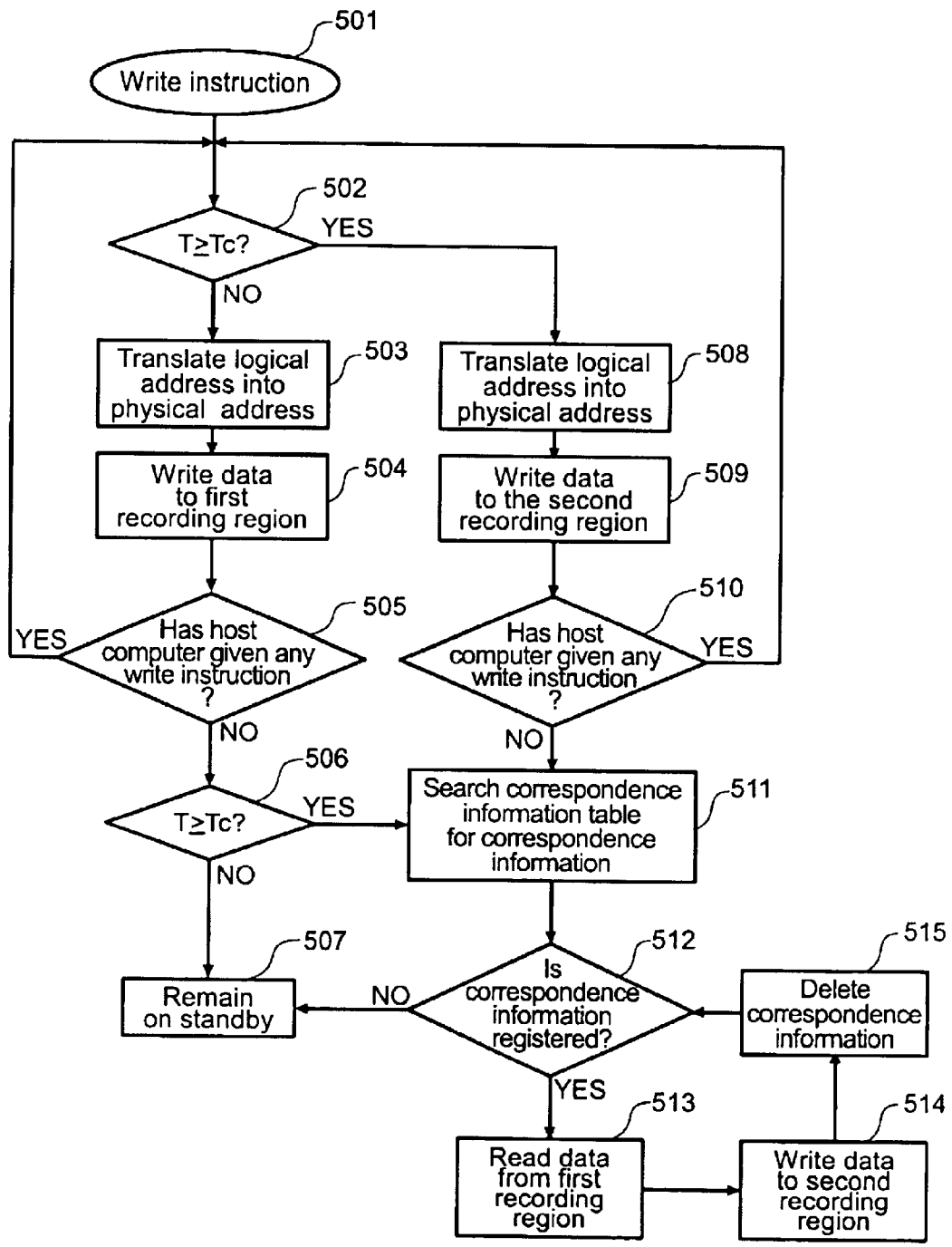
FIG. 5 is a flow chart of a write operation control procedure to be carried out by a magnetic disk drive of the present invention.

FIG. 5 is a flow chart of a write operation control procedure to be carried out by the magnetic disk drive of the present invention. The host computer 1 gives a write instruction through the interface to the hard disk controller 32 by using a logical address (step 501). The magnetic disk drive 3 decides whether the measured surrounding temperature is higher than the predetermined critical temperature on the basis of an output signal provided by the temperature sensor 38 before moving the magnetic heads for seeking (step 502). If the surrounding temperature is lower than the predetermined critical temperature, i.e., if the magnetic disk drive 3 is in a low-temperature environment, the magnetic disk drive 3 translates the logical address into a physical address indicating a location in the first magnetic disk or the first recording area (step 503), and writes data to the first recording area (step 504). A query is made to see if a write instruction has been given by the host computer 1 (step 505). If the response in Step 505 is affirmative, the write operation control procedure returns to step 502. In step 504, writing conditions, such as the intensity of recording current and recording frequency, are adjusted to facilitate writing.

If the response in step 505 is negative, the surrounding temperature is measured and a query is made to see if the measured surrounding temperature is higher than the predetermined critical temperature (step 506). If the response in step 506 is negative, the magnetic disk drive 3 remains on standby in a low-temperature environment until the host computer 1 provides another instruction (step 507). While the magnetic disk drive 3 is on standby, the magnetic disk drive 3 is set in a power save mode. Even if the surrounding temperature drops from a temperature higher than the predetermined critical temperature $T_c$ to a temperature lower than the predetermined critical temperature $T_c$, the correspondence relation can be immediately grasped and operations in a low-temperature environment is possible because the surrounding temperature is measured and compared with the predetermined critical temperature $T_c$ in step 502.

If it is judged in step 502 that the surrounding temperature is higher than the predetermined critical temperature $T_c$, the magnetic disk drive 3 translates the logical address into a physical address specifying the second magnetic disk or the second storage area (step 508), and write the data to the second recording area by an ordinary write operation (step 509). A query is made to see if a write instruction is given by the host computer 1 (step 510) and, if the response in step 510 is affirmative, the write operation control procedure returns to step 502.

If the response in step 510 is negative, the correspondence information table 4 shown in FIG. 2 is searched for correspondence information (step 511). A query is made to see if correspondence information is registered in the correspondence information table 4 (step 512)

Affirmative response in step 512 signifies that data is written to the first recording area. Then, the data is read from the first recording area (step 513) and is written directly or through the cache memory included in the magnetic disk drive 3 to the second recording area (step 514). Since the data is transferred from the first recording area to the second recording area, the corresponding information is deleted from the correspondence information table 4 (step 515) and the write operation control procedure returns to step 512. If the response in step 512 is negative, the magnetic disk drive 3 remains on standby in an ordinary-temperature environment until the host computer 1 provides another instruction (step 507).

Figure 6:
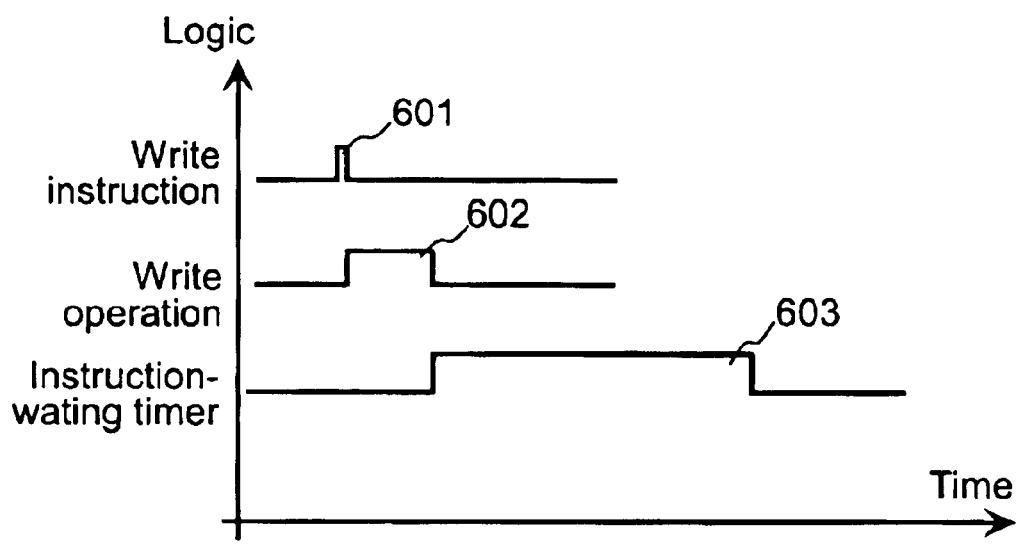
FIG. 6 is a time chart of assistance in explaining operations in steps 505 and 510 in FIG. 5.

Operations in steps 505 and 510 to see if any write instruction is given by the host computer 1 after the data has been written to the magnetic disk will be explained with reference to FIG. 6. When a write instruction 601 is given, a write gate 602 becomes effective and data is written to a recording surface. Upon completion of the write operation, a timer starts measuring time (603) and stops after the passage of a time interval of, for example, three seconds. The magnetic disk drive 3 measures the surrounding temperature and compares the measured surrounding temperature with the predetermined critical temperature $T_c$ (steps 502 and 506) at the stop of the timer.

Figure 7:
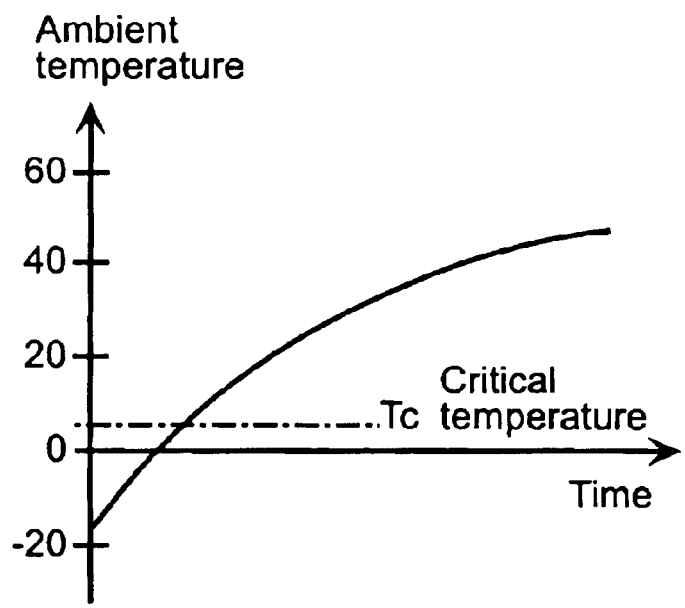
FIG. 7 is a graph showing the rise of temperature around the magnetic disk drive 3 with time.

FIG. 7 is a graph showing the variation of the surrounding temperature of the environment around the magnetic disk drive 3 with time. As typically shown in FIG. 7, the surrounding temperature rises gradually from −20° C. and rises further beyond the critical temperature $T_c$ of about 5° C. at which a write operation by a write means other than a first radium is possible. When the temperature of the environment around the magnetic disk drive 3 rises beyond the critical temperature $T_c$ immediately after data has been written in a low-temperature environment, the write operation control procedure branches from step 506 to step 511 for searching correspondence information. This branching is necessary to cope with the change of a low-temperature write mode for a write operation in a low-temperature environment into an ordinary-temperature write mode for a write operation in an ordinary-temperature environment because the surrounding temperature rises slowly in an actual situation.

From the foregoing it will be appreciated that the magnetic disk drive of the present invention is capable of stable recording at low temperatures and at the same time holding information when the surrounding temperature rises. Therefore, the magnetic disk drive as set forth is operable with high reliability even in an environment under severe temperature condition in which the surrounding temperature varies in a wide range from a low temperature to a high temperature.

Although specific embodiments of the invention have been described and illustrated, one skilled in the art will recognize other embodiments, not expressly described, but which fall within the scope of the invention.

We claim:

1. A magnetic disk drive comprising:
    a magnetic disk having first storage area and second storage area;
    a spindle motor that rotates said magnetic disk;
    a magnetic head capable of recording or retrieving data to or from said magnetic disk;
    an actuator that locates said magnetic head relative to said magnetic disk;
    a base fixedly holding said spindle motor and said actuator;
    a temperature sensor for measuring surrounding temperature;
    an interface that enables said magnetic head to transfer signals to and from an external device, a CPU that controls said actuator and said spindle motor; and
    a cover;
    wherein one of said first and second storage areas are selected based on surrounding temperature in recording data.

2. A magnetic disk drive as in claim 1 wherein said first and second storage areas differs in its data storage characteristic or in its data storage function.

3. A magnetic disk drive as in claim 1 wherein said interface comprises;
    a control circuit, and
    a read/write channel.

4. A magnetic disk drive as in claim 1, wherein said storage areas include
    a first storage area capable of writing information at low temperatures, and
    a second storage area capable of holding information at high temperatures.

5. A magnetic disk drive as in claim 4, wherein said second storage area is used for an ordinary recording operation.

6. The magnetic disk drive as in claim 4, wherein first coercive force of said first storage area is smaller than second coercive force of said second storage area.

7. A magnetic disk drive as in claim 1, wherein said storage areas include a first storage area, which data is recorded at low temperatures, and a second storage area, which assures data retention at high temperatures.

8. A magnetic disk drive as in claim 7, wherein said second storage area is used for an ordinary recording operation.

9. The magnetic disk drive as in claim 7, wherein first density of recording bits in a track of said first storage area is smaller than second density of recording bits in a track of said second storage area.

10. A method of controlling a magnetic disk drive comprising:

recording data in first storage area of a magnetic disk at low temperature; and recording data in second storage area of the magnetic disk at high temperature.

11. A method as in claim 10 wherein said magnetic disk drive includes a magnetic disk having first and second storage areas, and a temperature sensor for measuring surrounding temperature.

12. A method as in claim 10 wherein said first and second storage areas differs in its data storage characteristic or in its data storage function.

13. A method of controlling a magnetic disk drive comprising:

recording data in first storage area of a magnetic disk at low temperature; and recording said data stored in said first storage area in second storage area of the magnetic disk if surrounding temperature is high.

14. A method as in claim 13 wherein said magnetic disk drive includes a magnetic disk having first and second storage areas, and a temperature sensor for measuring surrounding temperature.

15. A method as in claim 13 wherein said first and second storage areas differs in its data storage characteristic or in its data storage function.

* * * * *